US012315397B2

(12) United States Patent
DeModica

(10) Patent No.: US 12,315,397 B2
(45) Date of Patent: May 27, 2025

(54) METHODS AND APPARATUS FOR ORGANIZING ITEMS

(71) Applicant: Capri S. DeModica, Scottsdale, AZ (US)

(72) Inventor: Capri S. DeModica, Scottsdale, AZ (US)

( * ) Notice: Subject to any disclaimer, the term of this patent is extended or adjusted under 35 U.S.C. 154(b) by 0 days.

(21) Appl. No.: 18/765,830

(22) Filed: Jul. 8, 2024

(65) Prior Publication Data

US 2024/0363032 A1 Oct. 31, 2024

Related U.S. Application Data

(63) Continuation of application No. 17/839,855, filed on Jun. 14, 2022, now Pat. No. 12,033,542, which is a continuation of application No. 17/134,721, filed on Dec. 28, 2020, now Pat. No. 11,361,680, which is a continuation-in-part of application No. 16/124,620, filed on Sep. 7, 2018, now Pat. No. 10,874,239.

(60) Provisional application No. 62/555,411, filed on Sep. 7, 2017.

(51) Int. Cl.
*G09F 3/16* (2006.01)
*A47G 25/14* (2006.01)
*G09F 3/00* (2006.01)

(52) U.S. Cl.
CPC .......... *G09F 3/16* (2013.01); *A47G 25/1414* (2013.01); *G09F 3/0298* (2013.01)

(58) Field of Classification Search
CPC ........... A47G 25/1407; A47G 25/1428; A47G 25/1414; G09F 3/16; G09F 3/0298
See application file for complete search history.

(56) References Cited

U.S. PATENT DOCUMENTS

| | | | | | |
|---|---|---|---|---|---|
| 1,699,238 | A | * | 1/1929 | Holworthy | G09F 3/16 40/617 |
| 1,745,942 | A | * | 2/1930 | Miley | G09F 3/16 40/658 |
| 3,398,475 | A | * | 8/1968 | Palmer | G09F 3/16 40/658 |
| 4,137,661 | A | * | 2/1979 | Johansson | A47G 25/1428 40/322 |
| 4,967,500 | A | * | 11/1990 | Bredeweg | A47G 25/1407 40/658 |
| 5,033,528 | A | * | 7/1991 | Volcani | F16M 11/40 403/56 |
| 5,056,248 | A | * | 10/1991 | Blanchard | A47G 25/1407 40/322 |
| 5,649,651 | A | * | 7/1997 | Lam | A47G 25/14 223/92 |

(Continued)

*Primary Examiner* — Gary C Hoge
(74) *Attorney, Agent, or Firm* — Noblitt & Newson, PLLC

(57) ABSTRACT

Methods and apparatus for organizing items according to various aspects of the present invention may comprise a hanger tag system to convey information relating to an item on a hanger. The hanger tag system may comprise, for example, a mount connected to the hanger and an information medium mounted on the mount, wherein the information medium provides information relating to the item. In various embodiments, the hanger tag system further comprises a connector configured to connect the mount to the hanger. In various embodiments, the information medium comprises a labeling surface.

22 Claims, 9 Drawing Sheets

(56) References Cited

U.S. PATENT DOCUMENTS

| | | | | |
|---|---|---|---|---|
| 6,163,997 | A * | 12/2000 | Deralas | A47G 1/17<br>40/745 |
| 6,182,871 | B1 * | 2/2001 | Lam | A47G 25/1407<br>223/120 |
| 9,286,816 | B2 * | 3/2016 | Stanley | G09F 21/04 |
| 9,622,606 | B1 * | 4/2017 | Rotello | A47G 25/1428 |
| 2004/0065702 | A1 * | 4/2004 | Yang | A47G 25/485<br>223/96 |
| 2007/0273520 | A1 * | 11/2007 | Chamandy | G06K 19/07749<br>340/572.1 |
| 2010/0192837 | A1 * | 8/2010 | Leoni | G09F 3/16<br>116/307 |
| 2011/0163143 | A1 * | 7/2011 | Zanetti | B60R 11/02<br>224/567 |
| 2011/0296728 | A1 * | 12/2011 | Bolt | G09F 3/14<br>235/494 |
| 2014/0117179 | A1 * | 5/2014 | Valls | G09F 3/16<br>248/299.1 |
| 2015/0272364 | A1 * | 10/2015 | Larsen | A47G 25/48<br>223/96 |

* cited by examiner

METHODS AND APPARATUS FOR ORGANIZING ITEMS

CROSS-REFERENCES TO RELATED APPLICATIONS

This application is a continuation of U.S. patent application Ser. No. 17/839,855 filed Jun. 14, 2022, which is a continuation of U.S. patent application Ser. No. 17/134,721, filed Dec. 28, 2020, now U.S. Pat. No. 11,361,680, which is a continuation-in-part of U.S. patent application Ser. No. 16/124,620, filed Sep. 7, 2018, now U.S. Pat. No. 10,874, 239, which claims the benefit of U.S. Provisional Patent Application No. 62/555,411, filed Sep. 7, 2017, and incorporates the disclosure of each application by reference.

BACKGROUND OF INVENTION

Identifying items stored on clothes hangers easily, without requiring that a hanger be removed from its place on a rack or closet rod, can be annoying. Similar garments viewed on hangers in place on a rack or closet rod, i.e., viewed from the side, appear indistinguishable. From the customary viewing angle, similarly colored pairs of pants, jeans, or suits, for example, are difficult to tell apart. Identifying garments typically requires removing the hanger from the rack or closet rod or trying to pivot the hanger in place to see a label or otherwise accurately identify the garment.

SUMMARY OF THE INVENTION

In various representative aspects, methods and apparatus for organizing garments and other items according to various aspects of the present invention may comprise a hanger tag system to convey information relating to an item on a hanger. The hanger tag system may comprise, for example, a mount connected to the hanger and an information medium mounted on the mount, wherein the information medium provides information relating to the item. In various embodiments, the hanger tag system further comprises a connector configured to connect the mount to the hanger. In various embodiments, the information medium comprises a labeling surface. The system may operate in conjunction with a computer program, such as a tablet or other mobile device app, to acquire, and organize or share information relating to the garments and other items.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

Current practice does not provide for an information-bearing medium, tag, or label to incorporate additional information about a garment in a manner that can be accessed or viewed without removing the item from a closet rod or repositioning the item on the rod for viewing from an angle perpendicular to a row of hanging garments in a conventional closet.

The present technology may be described in terms of functional block components and various processing steps. Such functional blocks may be realized by any number of hardware or software components configured to perform the specified functions and achieve the various results. For example, the present technology may employ various connectors, mounting elements, digital interfaces, labeling surfaces, and the like, which may carry out a variety of functions. In addition, the present technology may be practiced in conjunction with any number of organization and storage systems like closets and displays, and the systems described are merely exemplary applications. Further, the present technology may employ any number of conventional techniques for presenting information, connecting to structures, providing adjustability, and the like.

Methods and apparatus for identifying garments according to various aspects of the present invention may operate in conjunction with a hanger tag system. The hanger tag system may attach to a hanger, such as a conventional clothes hanger, upon which an item hangs. The hanger tag system may offer an information medium, such as a labeling surface, that is easily visible or otherwise readable, and/or another information medium such as an electronic storage device or identifier, while the hanger is in customary use on a rack or closet rod and without repositioning the hanger.

The garment may comprise any appropriate item hanging from the hanger, such as clothing or other items like blankets. The hanger tag system may facilitate the display or other provision of information on the side of the hanger, visible or otherwise accessible while a hanger is in customary use on a rack or closet rod, without removing the hanger from the rack or closet rod, and while still allowing the hanger to be fully functional for hanging a garment or item. The hanger tag system may also be associated with items that are not on hangers, such as belts and boxes of shoes, in which case the tag facilitates the display or other provision of information relating to the attached or otherwise associated item.

Figure 1:
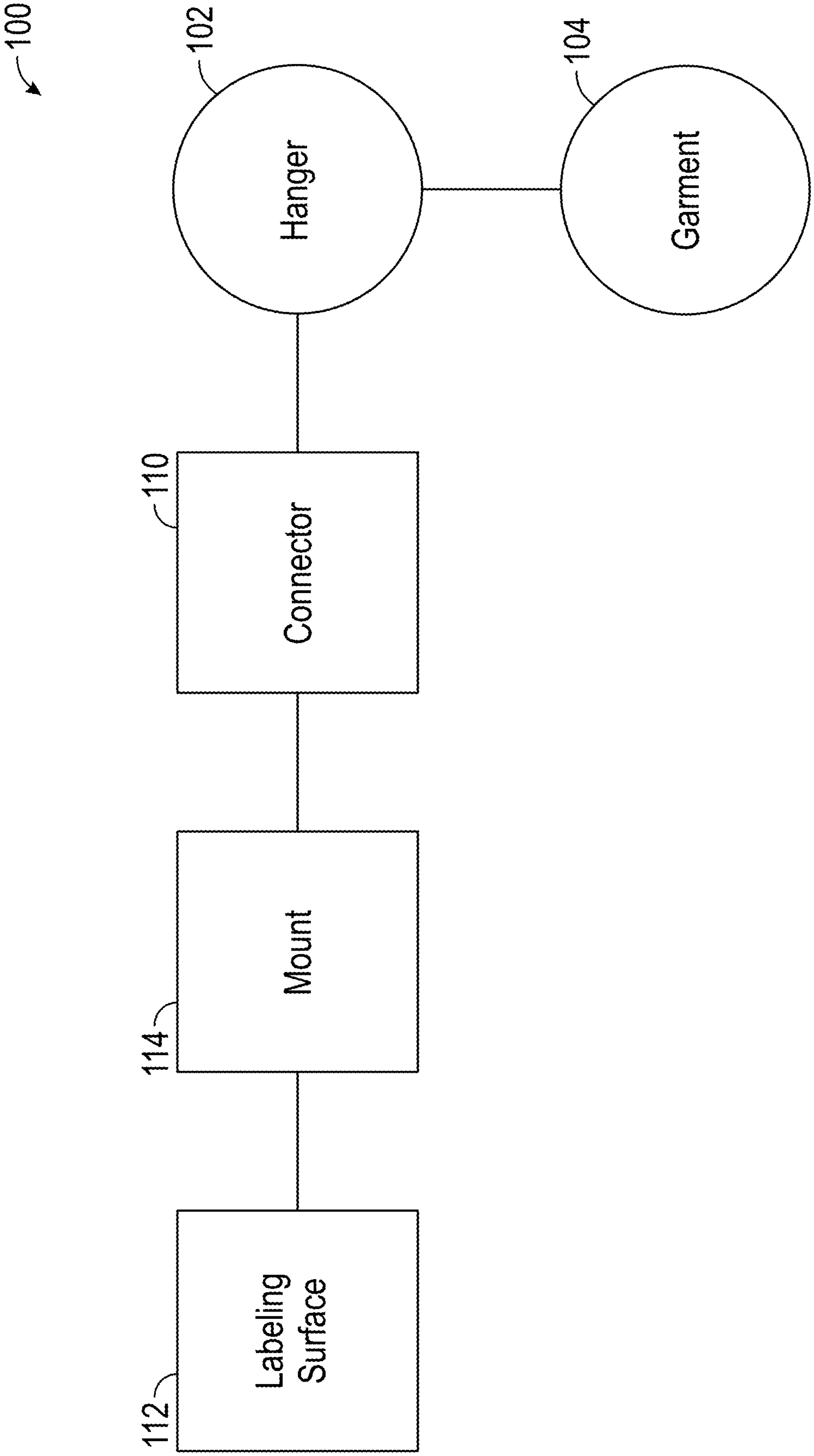
FIG. 1 is a block diagram representatively illustrating an exemplary hanger tag according to various aspects of the present invention.
Figure 2:
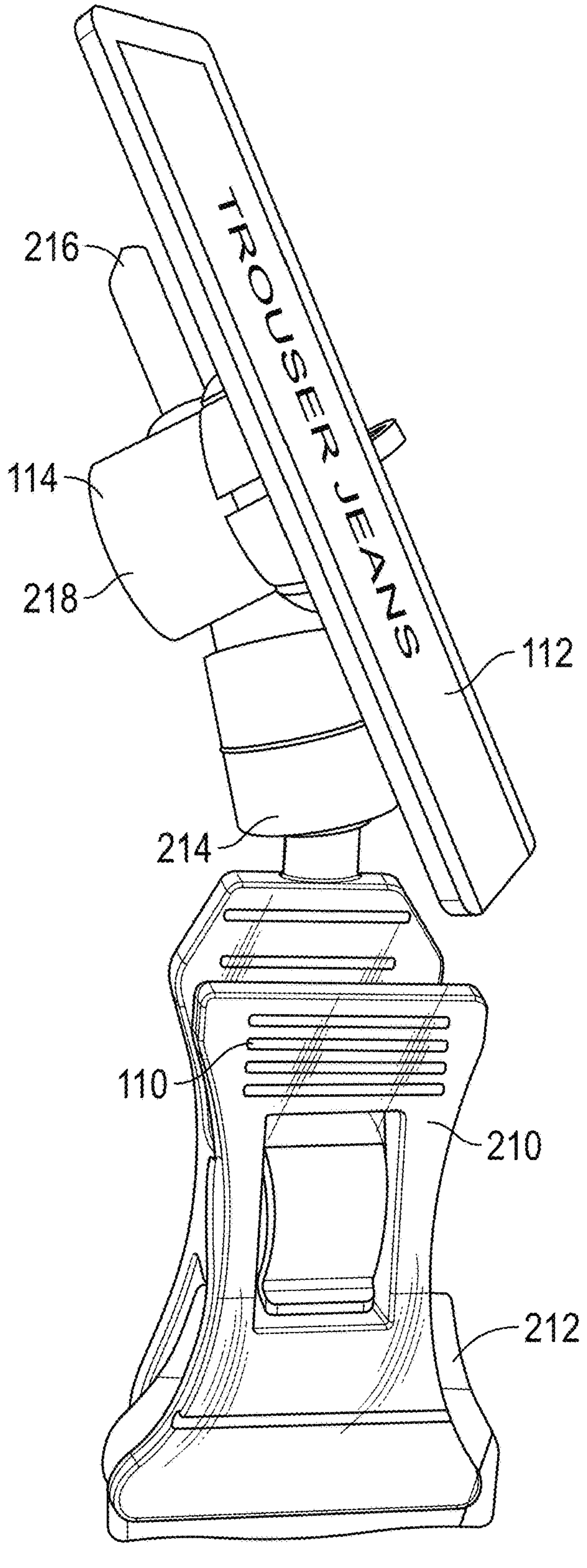
FIGS. 2-6 are representations of an exemplary hanger tag according to various aspects of the present invention from various perspectives.
Figure 3:
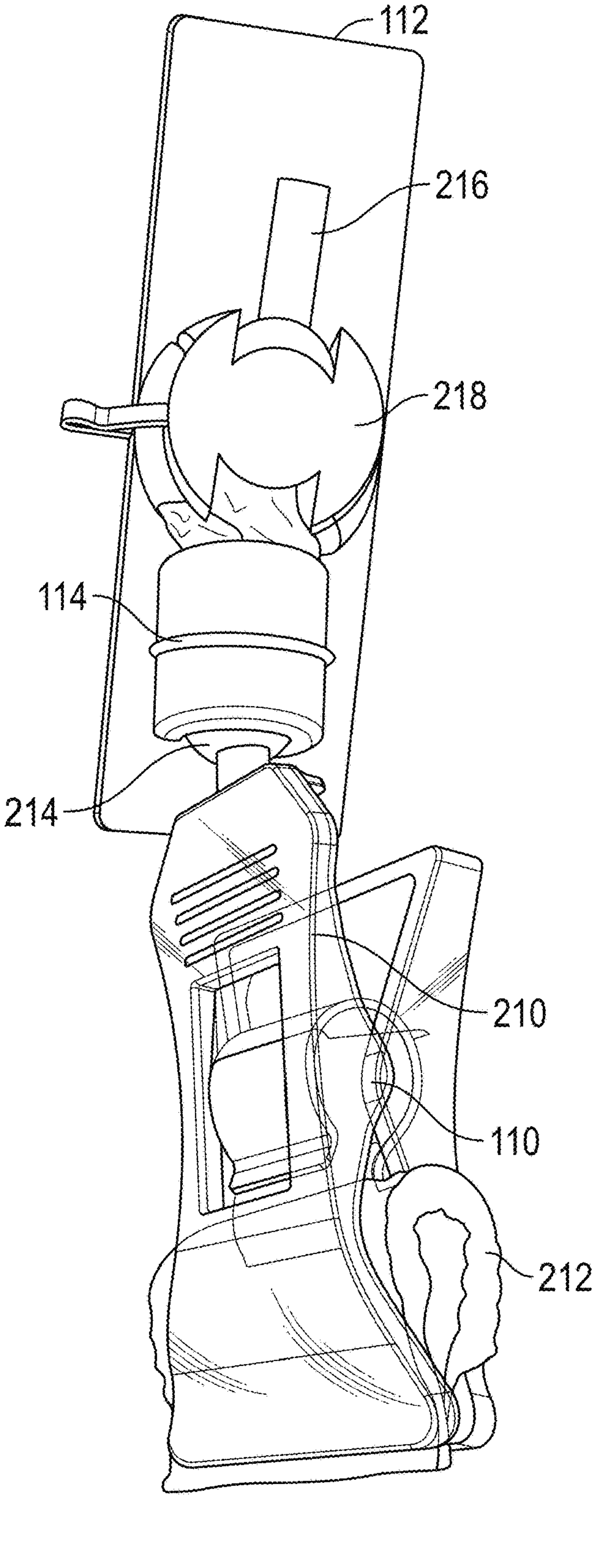
Figure 4:
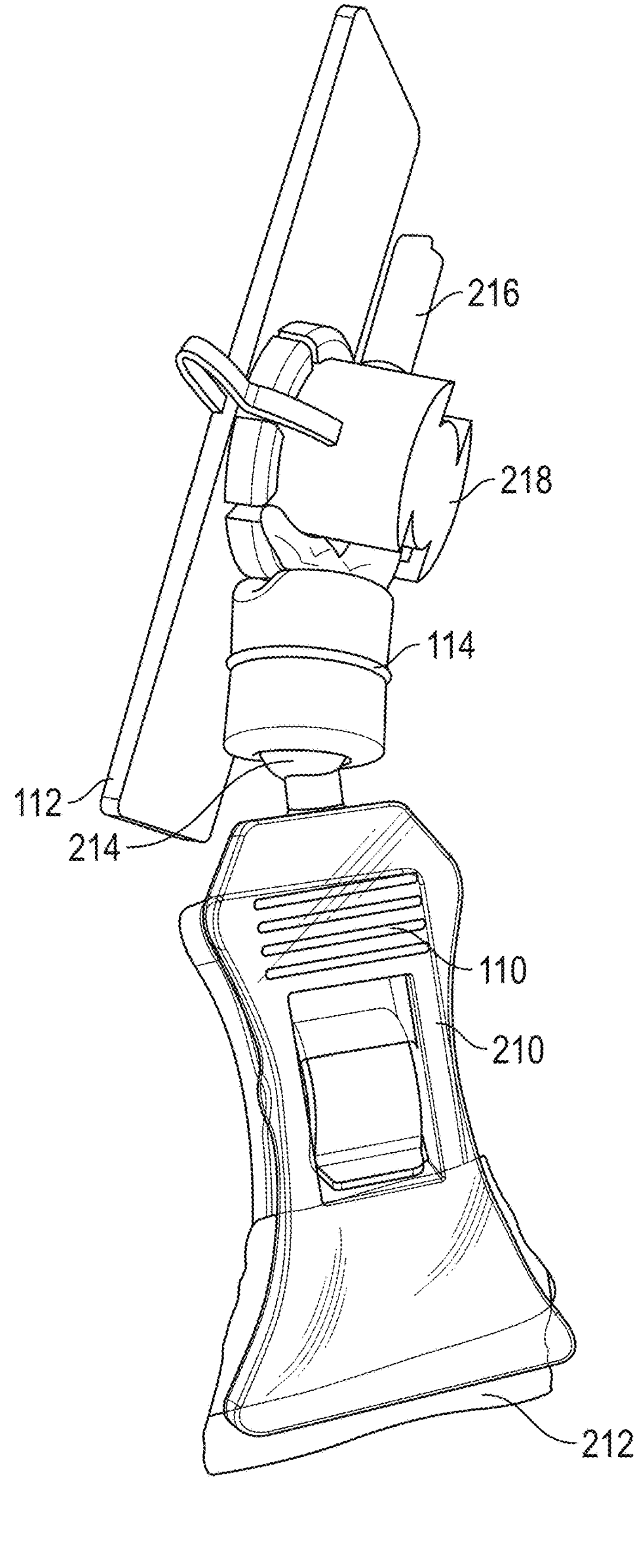
Figure 5:
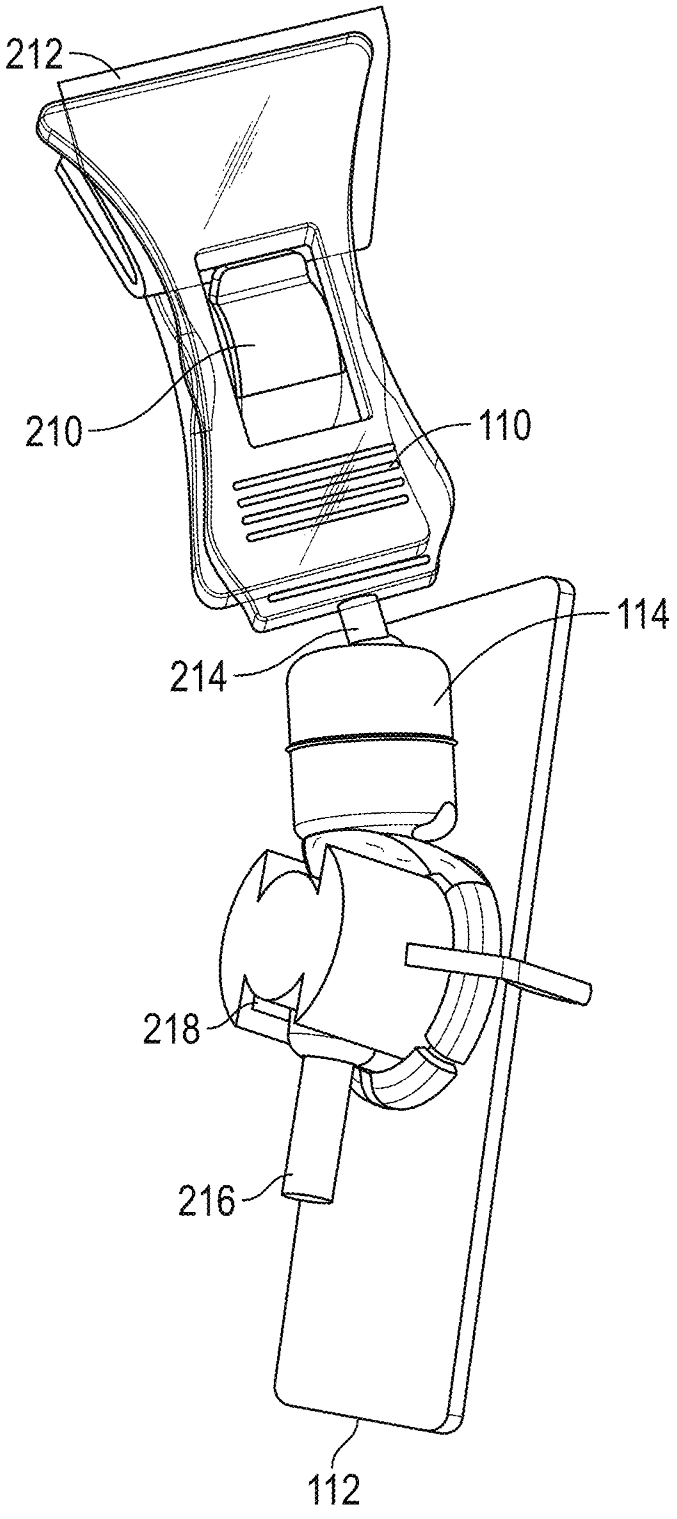
Figure 6:
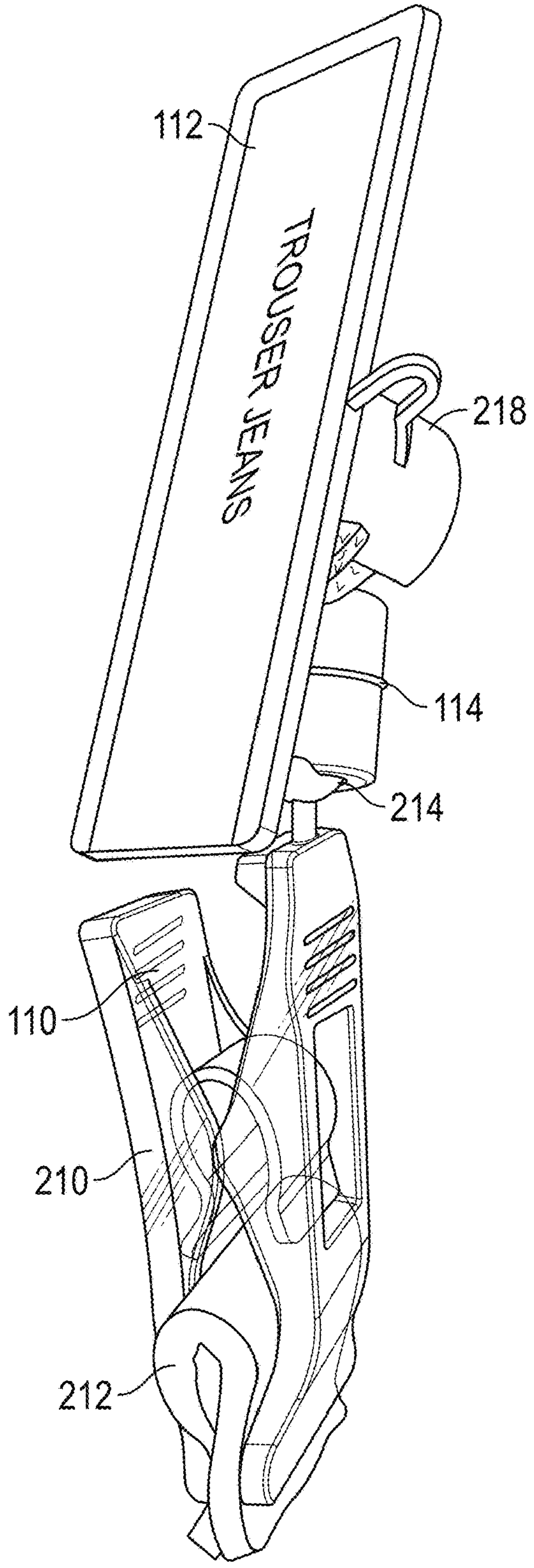

Referring to FIG. 1, in one embodiment, the hanger tag system may comprise a device for attaching a side-visible label (i.e., visible when an item is hung on a closet rod) to a clothes hanger. For example, an exemplary hanger tag 100 may comprise a connector 110 for connecting the hanger tag 100 to a hanger 102, an information medium such as a labeling surface 112 for conveying information relating to a garment 104, and a mount 114 for mounting the labeling surface 112 to the connector 110.

The connector 110 connects the device to the hanger 102. The connector 110 may connect the hanger tag 100 to the hanger 102 in any suitable manner, such as via a conventional clip, clamp, strap, adhesive, and the like. The connector 110 may connect to any suitable part of the hanger

102. For example, referring to FIG. 8, the connector 110 may connect to the neck 810 of the upright hook 812 that hangs from the rack or rod 814, or the upper portion of one of the supporting arms 816 of the hanger 102. The connector 110 may be removably connectable to the hanger 102 so that the connector 110 may be connected to the hanger 102 and selectively removed from the hanger 102.

In one exemplary embodiment, the connector 110 may comprise an easily removable and attachable device, which allows the device to be moved from one hanger 102 to another, for example to be placed on a new hanger 102 carrying a garment after dry cleaning. In the present embodiment, referring to FIGS. 2-6, the connector 110 may comprise a clip 210 or clamp, such as a conventional alligator clip, spring-loaded clothespin-type clip, spring-loaded clamp, or the like, which is biased to close around another structure, such as using a spring or other resilient element. In one embodiment, the connector 110 comprises a conventional plastic spring clamp that can accommodate a conventional hanger hook, such as about 12 or 14 gauge wire. The spring clamp may comprise a pair of jaws and a spring biasing the jaws towards a closed position.

The connector 110 may be configured to inhibit the labeling surface 112 from inadvertently shifting on the hanger 102 or rotating around the hanger 102 in a way that would interfere with it being visible while on a clothes rack or closet rod. For example, the connector 110 may securely attach to the hanger 102 to inhibit inadvertent repositioning, such as movement of the labeling surface 112 when the hanger 102 or nearby hangers 102 are moved. In one embodiment, the connector 110 may include a frictional material, such as padding 212 or a resilient material, to engage the hanger 102 surface and secure the connector 110 in place on the hanger 102 and inhibit shifting or rotation. For example, the frictional material may be placed within the jaws of the spring clamp so that the frictional material lines the interior of the jaws. The frictional material may comprise any appropriate material for engaging the hanger 102, such as a rubber interior element of compressible padding 212 disposed within the clip 210.

In an alternative embodiment, the connector 110 may be omitted. For example, the hanger tag 100 may be permanently attached to the hanger 102, such as by being integrated into the hanger 102 structure.

The system may further include an arm, for example between the connector 110 and the mount 114. The arm may extend away from the hanger, such as for visibility on a lower closet rod when clothes hung above may obscure the hanger stem and the label, or for visibility on an upper closet rod when the hanger stem may not be visible because it is too high above the viewer. In the present embodiment, the connector 110, mount 114, and/or arm may hold the information medium separate from and approximately horizontally away from the neck portion. In addition, the connector 110, mount 114, and/or the arm may hold the information medium of the hanger away from the neck portion in a direction substantially and/or approximately parallel to the main plane of the hanger, which may be generally defined by the top of the hook 812 of the hanger and the ends of the two arms 816 of the hanger.

Referring again to FIG. 1, the mount 114 supports the labeling surface 112 relative to the connector 110. The mount 114 may also facilitate positioning of the labeling surface 112 so as to be easily visible and readable or otherwise accessible from the side while the hanger 102 is in place on a rack or closet rod. The mount 114 may be nonadjustable such that the mount 114 maintains the labeling surface 112 in substantially constant position relative to the connector 110. Alternatively, the mount 114 may be adjustable to facilitate movement of the labeling surface 112 and the connector 110 with respect to one another, such as for ease of viewing of the labeling surface 112 from different angles. Accordingly, the mount 114 may connect to the connector 110, such as at an adjustable connection point that facilitates rotation, swiveling, length adjustments, or other changes of position. Likewise, the mount 114 may connect to the labeling surface 112 at an adjustable connection point that facilitates rotation, swiveling, length adjustments, or other changes of position.

In the present embodiment, referring to FIGS. 2-6, the mount 114 may provide a swiveling connection to the labeling surface 112, allowing the labeling surface 112 to be perpendicular to the mount's 114 longitudinal axis and visible from the side of the hanger 102. For example, the mount 114 may comprise a ball and socket joint 214, such as a ball rotatably and pivotably disposed within a socket. In the present embodiment, the ball comprises a smooth plastic ball rigidly connected to the connector 110. The socket may comprise a plastic cylinder including a cavity that mates with the ball to allow the ball to move within the cavity. The ball may fit sufficiently snugly within the cavity to allow movement of the ball with application of adequate force but inhibit further movement if adequate force is not applied.

The mount 114 may further comprise a post 216 rotatably disposed through a rotatable label mount 218 connected to the labeling surface 112. Rotation of the labeling surface 112 around the post 216 and on the rotatable label mount 218 facilitate further adjustment of the labeling surface 112 viewing angle.

The information medium may be mounted on the mount 114 and is configured to store and provide information relating to the garment or other item. In various embodiments, the information medium is updatable so that the information stored and provided by the information medium may be updated or otherwise changed, such as when a garment is first assigned to the hanger tag, changed to a different item, cleaned, or the like.

For example, referring again to FIG. 1, the information medium may comprise the labeling surface 112, which may convey information, including but not limited to item identification, in a format that is easily viewed without having to remove the individual clothes hanger 102 from the rack or closet rod. Such information may include, but is not limited to, a description of the garment 104 (type, color, etc.), information regarding coordinating garments 104 or accessories, a categorization system reference point, a photograph, designated hanging/storage location, last date worn, last cleaning date, or references for travel/packing planning. In the present embodiment, the labeling surface 112 is oriented approximately and/or substantially perpendicular to the main plane of the hanger 102.

A direct representation of the information may be writing the information on the easily-viewed labeling surface 112, or using symbols or color codes. Information can also (or instead) be conveyed indirectly via alternative information media, including a digital information recall device, such as barcode, QRC code, categorization system, or similar information-conveying format interfaced with a computer or mobile device-based application. A thumb wheel or other similar analog device may be incorporated into or replace the labeling surface 112 to indicate, for example, the last use or clean date. The labeling surface 112 may comprise interchangeable elements, such as differently shaped or colored labeling surfaces 112 that can be attached to the mount 114 to facilitate a visual cue for a categorization system.

In the present embodiment, referring to FIGS. 2-6, the labeling surface 112 is mounted on the mount 114 extending from the connector 110. The labeling surface 112 provides an area large enough to convey information, including providing a font size or other interface that is easily readable or otherwise understandable. Information may be added to the labeling surface 112 in any appropriate manner, such as by writing directly on the labeling surface 112, adhering a typed or written sticker to the labeling surface 112, adjusting a thumb wheel on the labeling surface 112, and/or the like.

The information medium, such as the labeling surface 112, may be updatable such that the information provided by the information medium may be changed, for example to update information relating to the garment. For example, when an item is worn or washed, the information on the labeling surface 112 may be updated accordingly, such as by adhering a new label over an old label, erasing prior writing and adding new writing, adjusting a thumb wheel on the labeling surface 112, and/or updating a corresponding entry in the program or app. Likewise, when a garment 104 is replaced by another item, the labeling surface 112 may be changed to include desired information for the new garment 104 and remove information about the old item. If the connector 110 is configured to be removable from the hanger 102, the hanger tag 100 may be removed from the hanger 102 and attached to a different hanger 102.

In various embodiments, the labeling surface 112 may include an electronic identifier using a digital interface on the hanger 102 or hanger tag 100, such as a barcode, QRC code, or the like. The digital interface may cooperate with other devices. For example, a portable device like a cellular phone, tablet, other mobile device, or dedicated tool may read the information from the labeling surface 112 for organizing and recalling and/or sharing information about the garment 104 or other item. In other embodiments, the information medium may comprise an electronic storage device, such as a digital memory, or an electronic identifier, such as an RFID tag or a near-field communication (NFC) enabled device, which may be provided instead of or in addition to the labeling surface.

Figure 7:
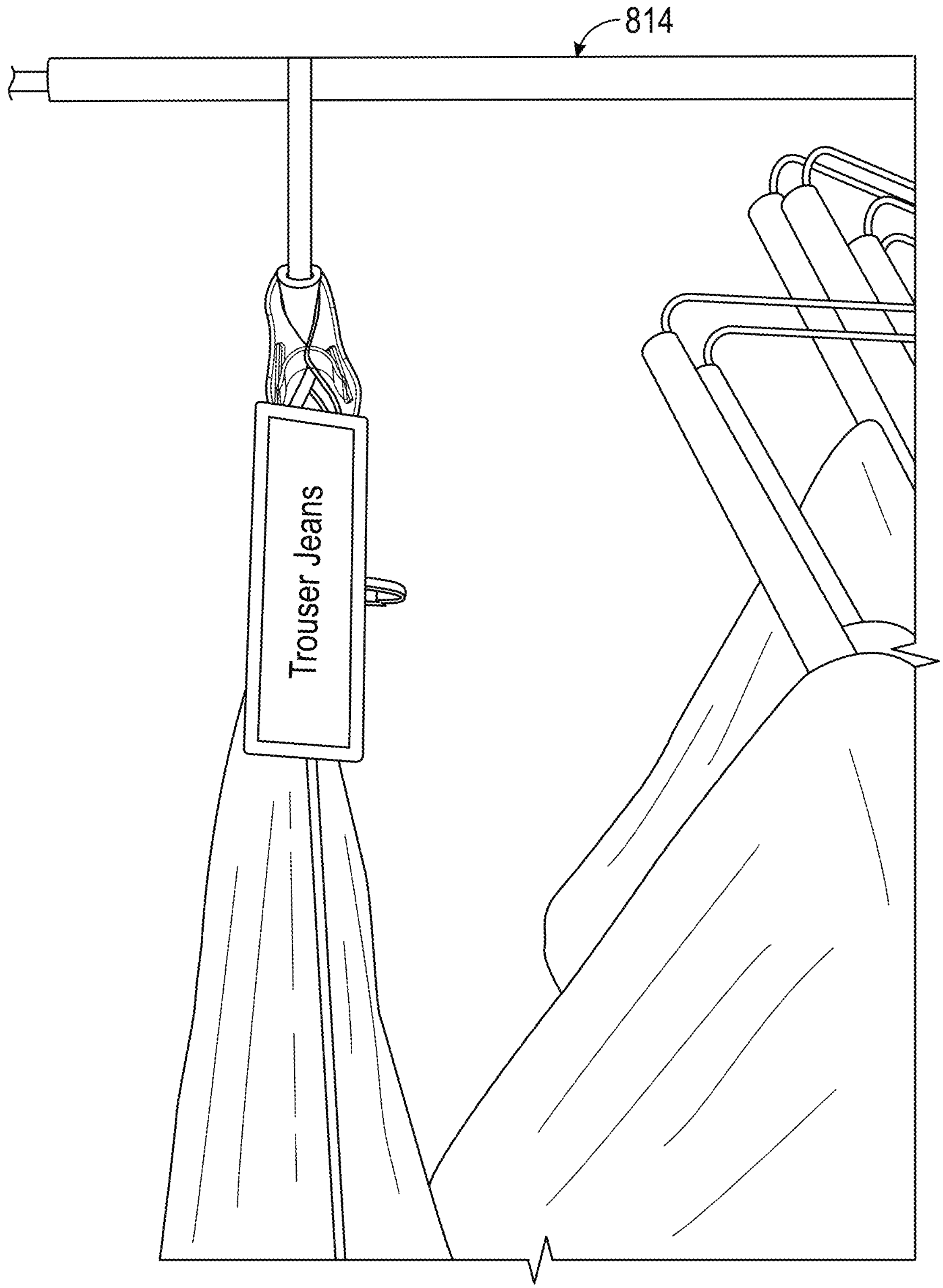
FIGS. 7-9 are representations of an exemplary hanger tag according to various aspects of the present invention operating in conjunction with a hanger and rod from various perspectives.

In operation, methods and apparatus for identifying garments 104 according to various aspects of the present technology may comprise adding information to the labeling surface 112, for example and referring to FIG. 7, information relevant to a particular garment 104 or other labeled item. The hanger tag 100 may be connected to the hanger 102 for the garment 104 such that mount and the connector hold the information medium approximately horizontally away from the neck 810 of the hanger 102. The hanger tag 100 may extend the information medium any appropriate distance away from the neck 810 as to be viewable, such as one half-inch or less, one inch, or one to four inches, or one to eight inches. In different embodiments, the hanger tag 100 extends the information medium 0.25 (or less), 0.5, 1, 2, 3, 4, 5, 6, 7, and 8 inches from the neck 810.

Figure 8:
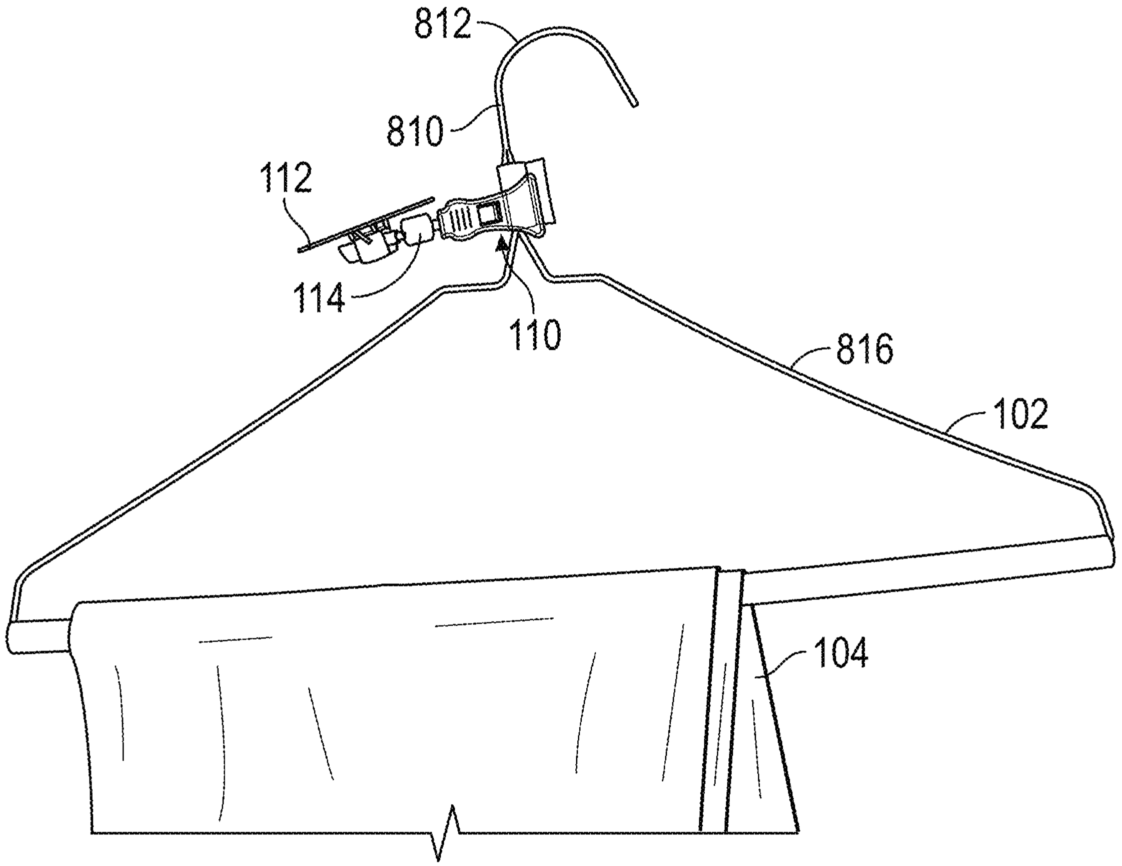
Figure 9:
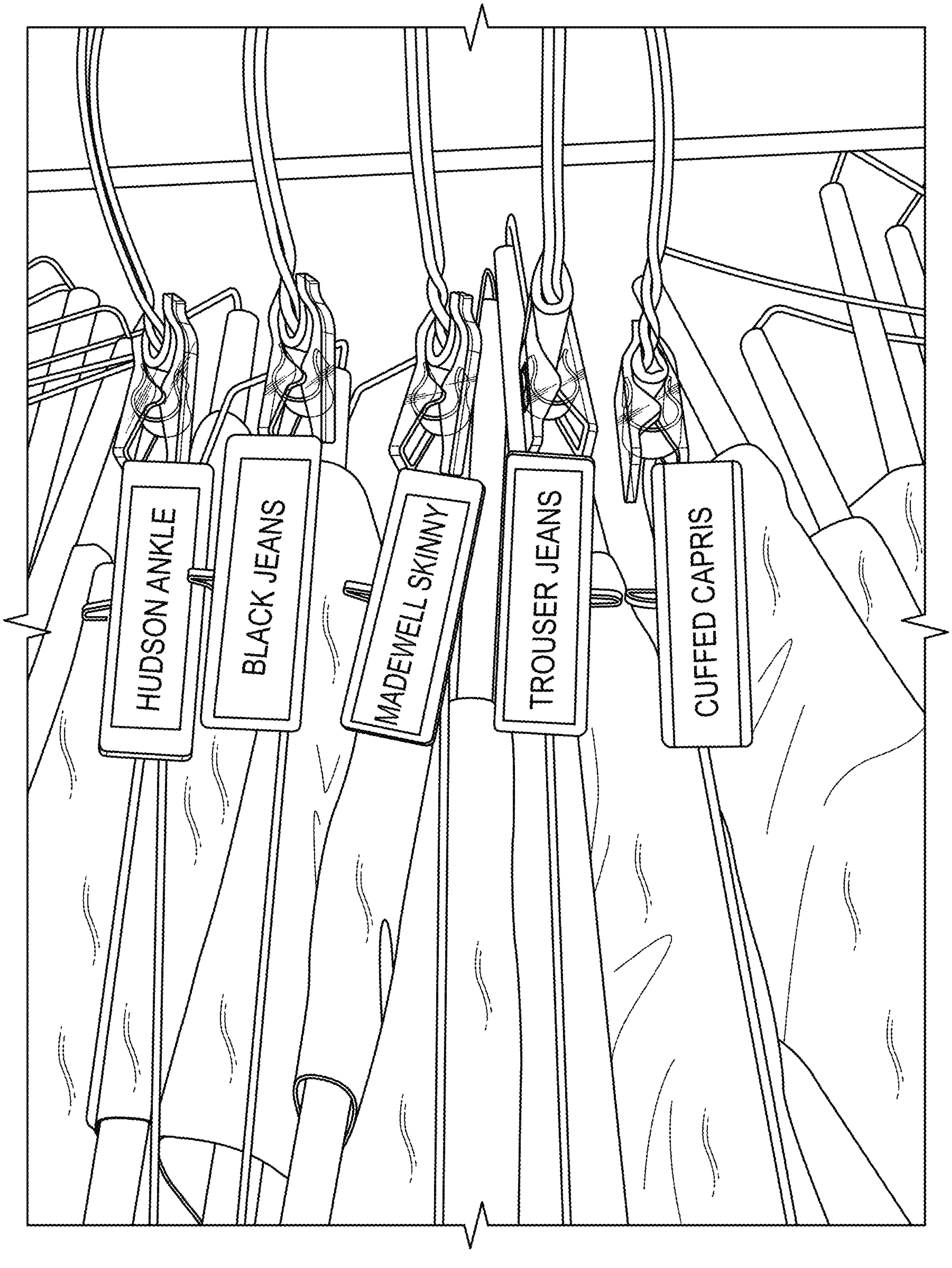

The garment 104 may be hung on a rod or other support via the hanger 102 (FIG. 8). The labeling surface 112 extends from the hanger 102 towards the user, and the user may adjust the position of the labeling surface 112 on the mount 114 to the desired viewing angle. In the present embodiment, the labeling surface 112 may be adjusted on the mount 114 via one or more of the ball and socket joint, the post, and the rotatable label mount 218. The process may be repeated with multiple hanger tags 100 on multiple hangers 102 on the same rod such that the hanger tags 100 present a row of labeling surfaces 112 visible to the user for the various hangers 102 and garments 104 hung from them (FIG. 9).

The hanger tag system may further include or operate in conjunction with a computer program, such as an app running on a tablet or cellular telephone. The computer program may have access to a memory to store information relating to the hanger tags and the garments, and may access other information, such as via a global or local network like the Internet or an LAN, to provide additional information to the user. In the present embodiment, the computer program comprises an app running on cellular telephone, tablet, or other personal device having a local memory and access to the Internet.

The app may be populated with information relating to the hanger tags and the associated garments. The information may be received and stored in any suitable manner. For example, the app may request information regarding an information tag, such as in response to the user selecting a "new tag" option, and the user may provide the requested information in any appropriate manner. For example, the user may provide the hanger tag information to the app, such as by typing or dictating an alphanumeric identifier or scanning a barcode or other optical representation using a camera or other scanner.

The user may also provide information relating to the garment or other item associated with the hanger tag, such as a description, maker, date of acquisition, color, SKU, photo, size, care instructions, date of last cleaning, or fabric. The app may collect information from other sources as well, such as by checking Internet resources for information relating to the item, such as according to the SKU. The information may be stored locally or remotely or both, and may be provided in free form and/or a series of fields. The process may be repeated for multiple items, and the app may collect the information, such as in a database. As a result, each hanger tag is associated with a database entry with information relating to the associated garment or other item.

The stored information may be updated. For example, the user may update the cleaning information for the item when it returns from the cleaner. The user may also add information regarding combinations of items to form outfits. For example, the user may select a "save outfit" option, and then scan the hanger tag associated with each item in the combination, such as a jacket-shirt-pants-belt-tie-shoes-watch combination. The user may add additional notes for the outfit as well, such as the occasion and date on which the outfit was worn to avoid repetition in the same environment. The user can then save the information relating to the outfit.

The user may later recall the information about the outfit in any appropriate manner, such as by selecting the outfit from a list of saved outfits, or requesting a list of outfits associated with a particular item and its hanger tag. The app may provide an image of the various elements of the outfit so the user can see the all elements of the combination. The app may also suggest additional items that could be associated with the item for form a complete or partial outfit, such as in conjunction with a remote database or online consultant. The app may be adapted for any collections of garments or other items, such as for use by retail sales associates to suggest additional items of interest to a customer, such as using a hanger tag, QRC, or other identifier associated with an item in a store, catalog, or other outlet.

The app may also facilitate publication of stored information regarding the items. For example, a user may select various sharing operations to provide information via social media, such as Facebook, Twitter, or Instagram. In one embodiment, the user may share information regarding the entire collection, creating a "virtual closet share." The publication may include any appropriate information, such as photos of particular items and/or saved outfits. Others can review, comment, and make suggestions regarding the published information.

The hanger tag system is not limited to the particular embodiments as described. For example, the hanger tag system may comprise an integrated, single-unit element, in contrast to the assembly of distinct connectors 110, mounts 114, and labeling surfaces 112. Further, the methods and apparatus may be adapted for other applications and environments, such as for labeling items other than garments 104 that are hung or stored in a manner that makes them not clearly visible, including items stored in a position perpendicular to the viewer, similar to the arrangement of clothes hangers 102 in a closet. Other applications and environments include retail displays of clothing or hanging merchandise, dry cleaning or tailor racks, or merchandisers.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A hanger tag system to convey information relating to an item on a hanger, comprising:
- an information medium; and
- a connector connected to the information medium and removably connectable to the hanger, wherein:
  - the connector holds the information medium away from the hanger in a direction approximately parallel to a main plane of the hanger; and
  - a position of the information medium is adjustable relative to the hanger and the connector.

2. A hanger tag system according to claim 1, wherein the connector connects to a neck portion of the hanger.

3. A hanger tag system according to claim 1, wherein the connector connects to a wire portion of the hanger.

4. A hanger tag system according to claim 1, wherein the connector connects to an upper portion of an arm of the hanger.

5. A hanger tag system according to claim 1, wherein the connector comprises a clip.

6. A hanger tag system according to claim 1, wherein the connector comprises a frictional material positioned to engage the hanger.

7. A hanger tag system according to claim 1, further comprising a mount connected to the connector and supporting the information medium, wherein the information medium is adjustable around at least one axis of the mount.

8. A hanger tag system according to claim 1, wherein the information medium is updatable.

9. A hanger tag system according to claim 1, wherein the information medium comprises an electronic identifier.

10. A hanger tag system for providing information relating to a garment on a hanger having a neck portion, comprising:
- an information medium, wherein the information medium comprises a labeling surface having at least one planar axis oriented approximately perpendicular to a main plane of the hanger, wherein the labeling surface is adjustable, and wherein adjusting the labeling surface changes a viewing angle of the labeling surface; and
- a connector releasably connectable to the hanger, wherein the connector holds the information medium away from the hanger in a direction approximately parallel to the main plane of the hanger.

11. A hanger tag system according to claim 10, wherein the connector connects to the neck portion of the hanger.

12. A hanger tag system according to claim 10, wherein the connector connects to a wire portion of the hanger.

13. A hanger tag system according to claim 10, wherein the connector connects to an upper portion of an arm of the hanger.

14. A hanger tag system according to claim 10, wherein the connector comprises a frictional material positioned to engage the hanger.

15. A hanger tag system according to claim 10, wherein the information medium comprises an electronic identifier.

16. A hanger tag system according to claim 10, wherein the connector holds the information medium horizontally at least one inch away from the neck portion of the hanger.

17. A hanger tag system according to claim 10, further comprising a mount holding the information medium, wherein the mount comprises a ball-and-socket joint.

18. A hanger tag system for providing information relating to a garment on a hanger having a neck portion and an arm portion, comprising:
- a connector removably connectable to the hanger;
- a planar labeling surface, wherein the labeling surface comprises at least one planar axis oriented approximately perpendicular to a main plane of the hanger; and
- a mount connected to the connector and the labeling surface, wherein the mount and the connector hold the labeling surface away from the hanger in a direction approximately parallel to the main plane of the hanger, and wherein adjustment of the mount changes a viewing angle of the labeling surface.

19. A hanger tag system according to claim 18, wherein the mount and the connector hold a nearest edge of the information medium at least one inch away from the neck portion of the hanger.

20. A hanger tag system according to claim 18, wherein the connector connects to the neck portion of the hanger.

21. A hanger tag system according to claim 18, wherein the connector connects to the arm portion of the hanger.

22. A hanger tag system according to claim 18, wherein the connector connects to a wire portion of the hanger.

* * * * *